US012570111B2

(12) United States Patent
Sato

(10) Patent No.: US 12,570,111 B2
(45) Date of Patent: Mar. 10, 2026

(54) PNEUMATIC TIRE

(71) Applicant: Toyo Tire Corporation, Itami (JP)

(72) Inventor: Yoshiki Sato, Itami (JP)

(73) Assignee: Toyo Tire Corporation, Itami (JP)

( * ) Notice: Subject to any disclaimer, the term of this patent is extended or adjusted under 35 U.S.C. 154(b) by 0 days.

(21) Appl. No.: 18/527,661

(22) Filed: Dec. 4, 2023

(65) Prior Publication Data

US 2024/0190181 A1 Jun. 13, 2024

(30) Foreign Application Priority Data

Dec. 8, 2022 (JP) ................................. 2022-196336

(51) Int. Cl.
B60C 13/00 (2006.01)

(52) U.S. Cl.
CPC .................................. B60C 13/001 (2013.01)

(58) Field of Classification Search
CPC .............................. B60C 13/001; B60C 13/00
See application file for complete search history.

(56) References Cited

U.S. PATENT DOCUMENTS

| | | | | |
|---|---|---|---|---|
| 4,198,774 A | * | 4/1980 | Roberts ..................... | G09F 3/00 40/616 |
| 5,807,446 A | | 9/1998 | Ratliff, Jr. | |
| 2010/0000649 A1 | * | 1/2010 | Iwabuchi .............. | B60C 13/001 152/523 |
| 2010/0051159 A1 | | 3/2010 | Fujioka | |
| 2012/0211135 A1 | | 8/2012 | Kojima et al. | |
| 2016/0288584 A1 | | 10/2016 | Muhlhoff | |

| | | | |
|---|---|---|---|
| 2019/0263195 A1 | | 8/2019 | Nakajima |
| 2019/0291517 A1 | | 9/2019 | Nakajima |
| 2022/0055416 A1 | * | 2/2022 | Nakajima ............. B60C 13/001 |
| 2022/0324268 A1 | | 10/2022 | Shimizu |

FOREIGN PATENT DOCUMENTS

| | | |
|---|---|---|
| JP | H10076815 A | 3/1998 |
| JP | 2007083604 A | 4/2007 |
| JP | 2008195136 A | 8/2008 |
| JP | 2019-147495 A | 9/2019 |

OTHER PUBLICATIONS

Non-Final or Final Office Action dated Oct. 24, 2024, issued in U.S. Appl. No. 18/527,709 (23 pages).
Non-Final or Final Office Action dated Oct. 16, 2024, issued in U.S. Appl. No. 18/527,737 (17 pages).
Final Office Action dated Aug. 13, 2025, issued in U.S. Appl. No. 18/527,737 (28 pages).
Final Office Action dated Sep. 2, 2025, issued in U.S. Appl. No. 18/527,709 (23 pages).
Non-Final Office Action dated Dec. 22, 2025, issued in U.S. Appl. No. 18/527,709 (14 pages).
Non-Final Office Action dated Jan. 14, 2026, issued in U.S. Appl. No. 18/527,737 (24 pages).

* cited by examiner

*Primary Examiner* — Justin R Fischer
*Assistant Examiner* — Nicholas J Weiler
(74) *Attorney, Agent, or Firm* — WHDA, LLP

(57) ABSTRACT

A tire includes at least one mark on a sidewall. The mark includes an outer surface including a wavy curved face having two or more and four or fewer peaks. More specifically, the mark includes an outer surface having two or more and four or fewer ridge-like curved faces extending in parallel to each other. The mark may include a circular protrusion protruding axially outward around an entire edge of the mark, and may thus be fringed with the circular protrusion.

13 Claims, 2 Drawing Sheets

PNEUMATIC TIRE

CROSS REFERENCE TO RELATED APPLICATION

This application claims priority to Japanese Patent Application No. 2022-196336 filed on Dec. 8, 2022, which is incorporated herein by reference in its entirety including the specification, claims, drawings, and abstract

TECHNICAL FIELD

The present disclosure relates to a pneumatic tire.

BACKGROUND

A pneumatic tire disclosed in JP 2019-147495 A is known. The pneumatic tire includes a mark disposed on a sidewall face of the tire, and the mark at least partially includes saw-tooth serrations of a plurality of ridges arranged in parallel. This pneumatic tire, including the mark having serrations with short pitches and different angles, allows light that irradiates the mark to be reflected in a large number of different directions. This generates variations of light and shadow parts on the mark to thereby allow the mark to be conspicuous.

SUMMARY

In the above-described pneumatic tire, the mark having serrations with fine pitches is likely to be clogged with mud while the vehicle is traveling on a muddy road. This deteriorates legibility of letters and also makes it difficult to clean off the dirt from the tire. An embodiment of the disclosure is therefore aimed toward providing a pneumatic tire having a conspicuous mark which is not easily clogged with mud.

To resolve the above problem, the pneumatic tire according to the present disclosure includes at least one mark on a sidewall of the pneumatic tire, and the at least one mark includes an outer surface having a wavy curved or uneven face with two or more and four or fewer peaks.

The configuration of the pneumatic tire according to the present disclosure allows a mark to look conspicuous while preventing the mark from being easily clogged with mud.

BRIEF DESCRIPTION OF DRAWINGS

The figures depict one or more implementations in accordance with the present teaching, by way of example only, not by way of limitations. In the figures, like reference numerals refer to the same or similar elements.

Embodiment(s) of the present disclosure will be described by reference to the following figures, wherein.

DESCRIPTION OF EMBODIMENTS

Figure 1:
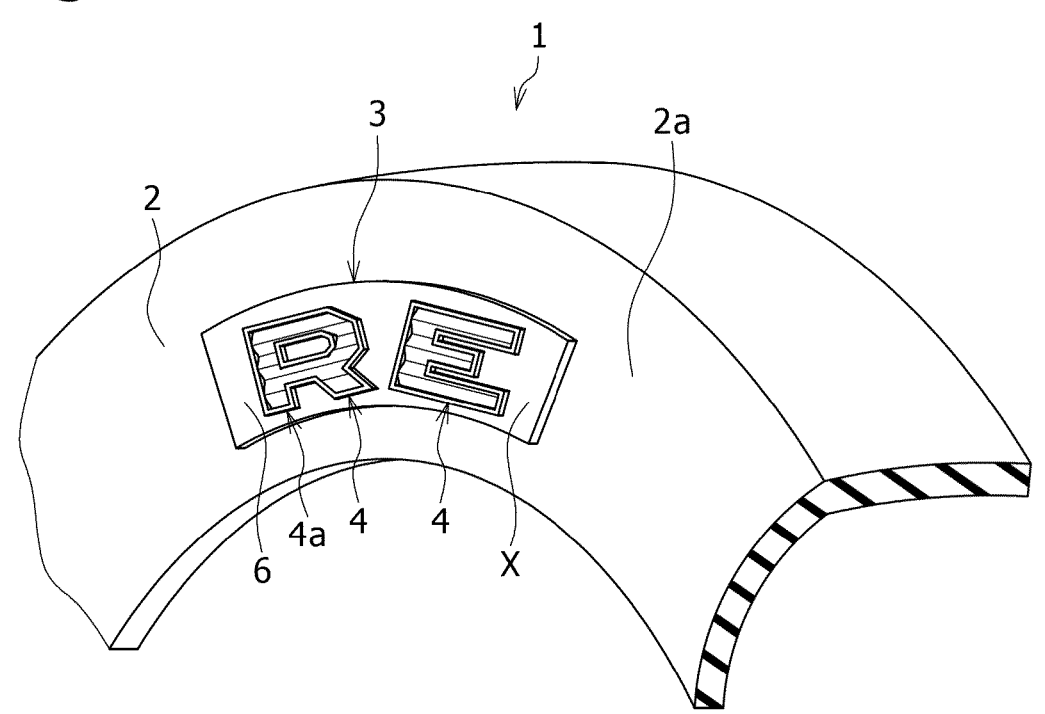
FIG. 1 is a perspective view of a pneumatic tire according to one embodiment of the disclosure, illustrating one side of the pneumatic tire viewed from diagonally above.

Embodiments of the disclosure will be described in detail below by reference to the drawings. It is expected that features of a plurality of embodiments and modification examples described below may be combined as appropriate to constitute new embodiments. In the following examples, identical elements are denoted with the same reference numerals and will not be explained repeatedly. A plurality of drawings include schematic views, and the dimensional ratios between the vertical length, horizontal length, and height, for example, of marks in different drawings are not always the same. Among the elements described below, elements that are not recited in independent claims representing the most superordinate concept are optional, not essential. In the following description, a "pneumatic tire" will be simply referred to as a "tire".

FIG. 1 is a perspective view of a tire 1 according to an embodiment of the disclosure, and illustrates one side of the tire 1 viewed from diagonally above. As illustrated in FIG. 1, the tire 1 includes at least one mark display region 3 on at least one sidewall 2. The sidewall 2 is on a side of the tire 1, and has a site where the tire 1 is most flexible. The sidewall 2 is smoothly bendable and is resistant to impacts and a centrifugal force.

The mark display region 3 includes a base face X on a top face 2a of the sidewall 2, and one or more marks 4 disposed on the base face X. The mark display region 3 has a seat 6 protruding from the top face 2a of the sidewall 2 to a predetermined height, and a top surface of the seat 6 functions as the base face X.

The seat 6 may be omitted; in this configuration, the top face 2a of the sidewall 2 functions as the base face X. The mark 4 includes characters, such as characters representing the name of the manufacturer, brand name, tire size, aspect ratio, week of the year of manufacture of the tire, or includes symbols such as speed signs and figures. In this embodiment, a brand name including a plurality of marks 4 is shown on the base face X.

Figure 2:
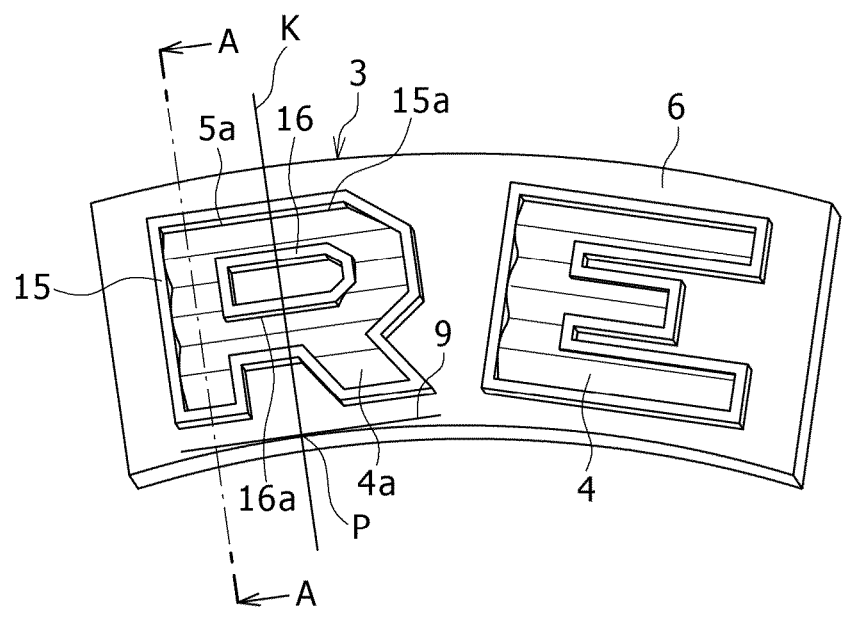
FIG. 2 is a perspective view of a mark display region when viewed from diagonally below in the axially outward direction.
Figure 3:
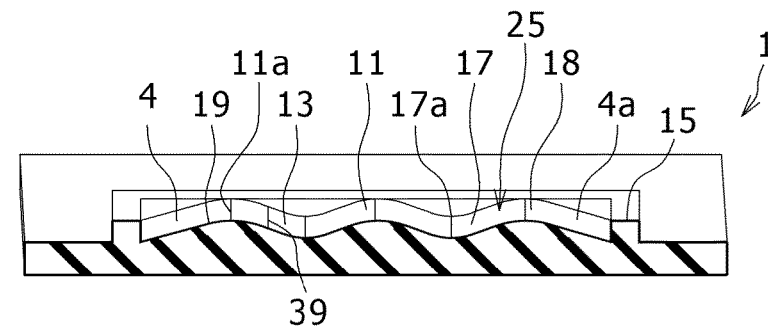
FIG. 3 is a perspective sectional view of the mark display region taken along line A-A in FIG. 2, which illustrates a configuration created by cutting the mark display region with a plane that extends through the left portion of a mark representing R in the mark display region and is orthogonal to a straight line extending site of the mark located at the outermost radial portion of the mark, when viewed in a slightly slanted axial direction.

FIG. 2 is a perspective view of the mark display region 3 viewed from diagonally below in the axially outward direction. FIG. 3 is a perspective cross sectional view of the mark display region 3 taken along line A-A in FIG. 2. FIG. 3 illustrates a configuration created by cutting the mark display region 3 with a plane that extends through the left portion of a mark 4a representing R in the mark display region 3 and that is orthogonal to a straight line extending site 5a of the mark 4a located at the outermost radial portion of the mark 4a, when viewed in a slightly slanted axial direction.

As illustrated in FIG. 3, the mark 4 includes an outer surface with a wavy curved or uneven face 25 having two or more and four or fewer peaks. The uneven face 25 further includes two or more and four or fewer ridge-like curved faces 11 extending substantially in parallel to one another. More specifically, the uneven face 25 includes three ridge-like curved faces 11 extending substantially in parallel to one another. Straight lines depicting tops 11a of adjacent ridge-like curved faces 11 are opposite to each other in the substantially radial direction at intervals. In the specification, the substantially circumferential direction is defined as a direction that is slanted at an angle of 30° or less with respect to a tangent 9 in the circumferential direction at a center P between a first circumferential end of the mark 4 and a second circumferential end of the mark 4. The substantially radial direction is defined, regarding the mark 4, as a direction that is slanted at an angle of 30° or less with respect to the radial direction passing through the center P between the first circumferential end of the mark 4 and the second circumferential end of the mark 4 in a plan view of the tire 1 viewed axially from axially outward.

FIG. 3 corresponds to a perspective cross sectional view of the mark display region 3 viewed from slightly slanted axial direction, when a left portion of the mark 4a representing R is cut with a plane including the substantially radial direction and the thickness direction of the seat 6. As illustrated in FIG. 3, the uneven face 25 includes, between adjacent ridge-like curved faces 11, a recess 17 having a curved face 13 with an upside-down ridge shape. In this embodiment, the uneven face 25 includes three curved faces 11 and two curved faces 13 smoothly connected alternately.

As illustrated in the perspective cross sectional view in FIG. 3, the wavy uneven face 25 has a smoothly connected shape. The uneven face 25 includes an inflection line between a projection 18 of the uneven face 25 and the recess 17 of the uneven face 25. More specifically, a curved line that protrudes axially outward and representing the wavy projection 18 and a curved line that protrudes axially inward and representing recess 17 having an upside-down ridge shape are connected smoothly. A curved line 19 created by smoothly connecting the axially outward curved line and the axially inward curved line includes the inflection line between the axial position of the top 11a of the projection 18 and the axial position of a bottom 17a of the recess 17.

As illustrated in FIG. 2, the mark 4 includes, around entire edges, circular protrusions 15 and 16 protruding axially outward to fringe the mark 4. The mark 4a representing R includes an outer circular protrusion 15 fringing the entire circumference of an outer edge 15a, and an inner circular protrusion 16 fringing the entire circumference of an inner edge 16a. The outer circular protrusion 15 and the inner circular protrusion 16 are included in the one or more circular protrusions disposed on the mark 4 and protruding axially outward. As illustrated in FIG. 3, an absolute value of the difference between the axial position of the top 11a at the outermost axial location of the mark 4 and the axial position of the axially outermost sites of the one or more circular protrusions 15 and 16 being 5 mm or less achieves an enhanced aesthetical view of the mark 4, and the absolute value of 3 mm or less provides the mark 4 with a particularly enhanced aesthetical view, thereby achieving a stylish mark 4.

Further, the mark 4 with the axial distance of 0.4 mm or greater between the axial position of the top 11a of the ridge-like protrusion 18 and the axial position of the bottom 17a of the recess 17 having an upside-down ridge shape has an enhanced three-dimensional property, resulting in a conspicuous mark 4. The mark 4 with the axial distance of 3 mm or less between the axial position of the top 11a of the ridge-like protrusion 18 and the axial position of the bottom 17a of the recess 17 having an upside-down ridge shape prevents mud clogging. Therefore, the axial distance between the axial position of the axially outermost site (that is the top 11a in this embodiment) of the uneven face 25 and the axial position of the axially innermost site of the uneven face 25 (that is the bottom 17a of the recess 17 in this embodiment) may be 0.4 mm or greater and 3 mm or smaller.

Figure 4:
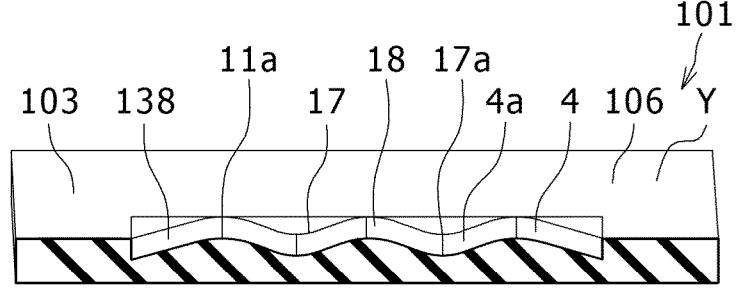
FIG. 4 is a perspective sectional view of a tire according to a first modification example, corresponding to FIG. 3.

FIG. 4 is a cross sectional view of a tire 101 according to a first modification example and corresponds to FIG. 3. As illustrated in FIG. 4, a mark display region 103 disposed on a sidewall includes a seat 106 protruding from the top face of the sidewall to a predetermined height, and the top face of the seat 106 functions as a base face Y.

The seat 106 includes a depression 138 having a substantially constant depth, and one or more marks 4 are disposed on the bottom face of the depression 138. In a mark having an inner edge such as the mark 4a representing R, the axial position of the outer surface of in the region enclosed with the inner edge may be substantially level with the axial position of the base face Y. The seat 106 may be omitted; in this configuration, the top face of the sidewall functions as the base face, and the top face of the sidewall includes a depression having substantially a constant depth and one or more marks 4 are disposed on the bottom face of the depression.

Referring to FIG. 4, an absolute value of the difference between the axially outermost position of the base face Y (the axial positions of the base face Y are level in the present embodiment) and the axial position of the axially outermost site of the mark 4 (which is the top 11a of the ridge-like protrusion 18) being 0.5 mm or less provides an enhanced aesthetical view of the mark 4, and the absolute value of 0.1 mm or less achieves the mark 4 with a further enhanced aesthetical view, thereby achieving a stylish mark 4.

In this modification example, similar to the above embodiment, the mark 4 with the axial distance of 0.4 mm or greater between the axial position of the top 11a of the ridge-like protrusion 18 and the axial position of the bottom 17a of the recess 17 having an upside-down ridge shape has an enhanced three-dimensional property, resulting in a conspicuous mark 4. The mark 4 with the axial distance of 3 mm or less between the axial position of the top 11a of the ridge-like protrusion 18 and the axial position of the bottom 17a of the recess 17 having an upside-down ridge shape prevents clogging with mud.

Figure 5:
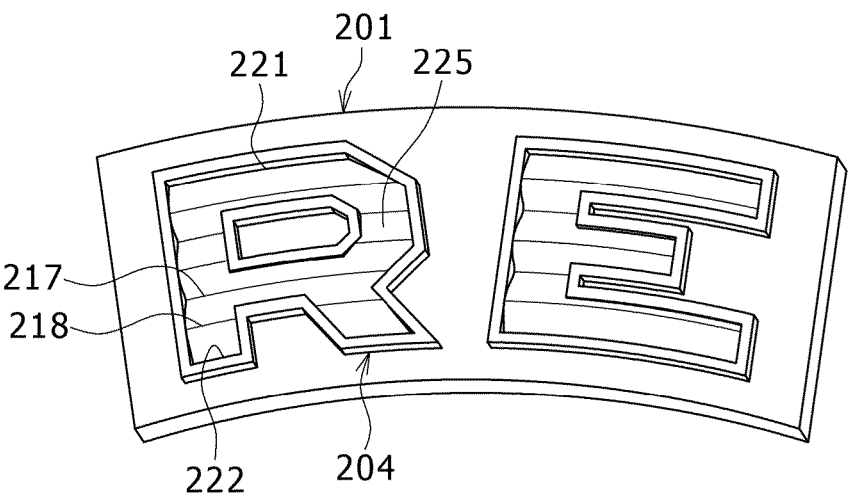
FIG. 5 is a perspective view of a tire according to a second modification example, corresponding to FIG. 2.

FIG. 5 is a perspective view of a tire 201 according to a second modification example, which corresponds to FIG. 2. As illustrated in FIG. 5, a wavy uneven face 225 on the outer surface of a mark 204 may include ridge-like protrusions 218 extending circumferentially substantially in parallel to each other, and recesses 217 having an upside-down ridge shape and extending circumferentially substantially in parallel to each other. A radially outward edge 221 of the mark 204 and a radially inward edge 222 of the mark 204 may extend circumferentially in parallel to each other.

As described above, the mark 4, 204 includes, on its outer surface, the wavy uneven face 25, 225 having two or more and four or fewer peaks, and the uneven face 25, 225 includes two or more and four or fewer ridge-like protrusions 18 extending substantially circumferentially. In some embodiments, all of the two or more and four or fewer ridge-like protrusions 18 have the same width and the same height, and the distance between the tops 11a of adjacent protrusions 18 among three or more protrusions 18 is also the same. However, the two or more and four or fewer ridge-like protrusions 18 may have different widths and different heights, and the distances between the tops 11a of adjacent protrusions 18 among three or more protrusions 18 may also be different.

Basic Configurations

The tire 1, 101, 201 includes the one or more marks 4, 204 on the sidewall 2. The mark 4 includes the outer surface including the wavy uneven face 25, 225 having two or more and four or fewer peaks.

The mark according to the disclosure includes at most four wavy peaks, and therefore includes a much smaller number of valleys between adjacent peaks than a mark having serrations with short pitches and different angles. The mark 4, 204 further has a wavy top face with no sharp corners in the valleys. This synergy effect reduces clogging of the mark 4, 204 with mud.

Further, the mark 4, 204 includes, on its outer surface, the wavy uneven face 25, 225 which reflects light in different directions depending on the angle at which a human views the mark 4, 204, to thereby produce variations of light and shadow. This configuration provides significant three-dimensional property of the mark 4, 204 and also achieves unusual and unique legibility in the mark 4, 204. This achieves the mark 4, 204 with a stylish design, making the mark 4, 204 conspicuous.

Optional Configurations

As illustrated in FIG. 1 to FIG. 3, the mark 4, 204 may include the circular protrusions 15 and 16 protruding axially outward around the entire edge of the mark 4, 204, to allow the mark 4, 204 to be fringed with the circular protrusions 15 and 16.

This configuration of the mark 4, 204 having the entire edge fringed with the circular protrusions 15 and 16 allows the inner face of the circular protrusions 15 and 16 facing the mark 4, 204 to form a step which makes the mark 4, 204 conspicuous, thereby increasing legibility of the mark 4, 204.

Further, as illustrated in FIG. 4, the sidewall may include the base face Y and the depression 138 on the base face Y, and the mark 4 may be disposed at the bottom face of the depression 138.

In this configuration including the mark 4 on the bottom face of the depression 138, the position of an air pocket that may be produced during vulcanization and molding of the tire 101 is restricted to a side face of the depression 138 at the bottom which does not affect the aesthetic view of the mark, and a vent hole for air vent can be disposed on a side face of the depression 138 at the bottom which does not affect the aesthetic view of the mark 4. The configuration including the mark 4 on the bottom face of the depression 138 further inhibits failure in rubber flow and thus reduces generation of the air pocket itself. This provides the mark 4 that is clear and easy for humans to visually recognize.

Two adjacent peaks (ridge-like protrusions 18) on the uneven face 25, 225 may be arranged at intervals in the direction slanted at an angle of 30° or less relative to the radial direction. In some embodiments, two adjacent peaks (ridge-like protrusions 18) on the uneven face 25, 225 are arranged at intervals in the direction slanted at an angle of 15° or less relative to the radial direction.

This configuration including two adjacent peaks arranged at intervals in the direction slanted at 30° or less relative to the radial direction enables light to be reflected in different directions to produce variations of light and shadow on the mark 4, 104 when a human approaches the vehicle and therefore approaches the mark 4, 104.

As illustrated in FIG. 5, the outer surface of the mark 204 includes the ridge-like protrusions 218 extending circumferentially substantially in parallel to each other, and the radially outward edge 221 of the mark 204 and the radially inward edge 222 of the mark 204 extend circumferentially substantially in parallel to each other. This configuration increases design property of the mark 204, improving the aesthetic view of the mark.

The present disclosure is not limited to the embodiments and the modification examples described above, and various improvements and modifications may be made within the scope of the matter recited in the claims of the present application and within its equivalent scope.

Figure 6:
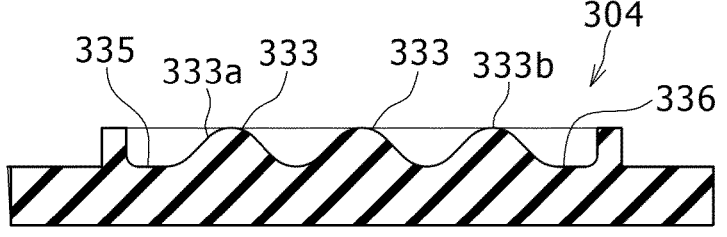
FIG. 6 is a schematic cross sectional view for explaining a mark in a tire in a third example.

FIG. 6 is a schematic cross sectional view for explaining a mark 304 in a tire according to a third modification example. As illustrated in FIG. 6, the mark 304 may include a flat face 335 on a first side of a first end protrusion 333*a* of a plurality of ridge-like protrusions 333 disposed substantially in parallel to each other. This configuration prevents mud from easily adhering to the first end of the mark. Similarly, the mark 304 may include a flat face 336 on a second side of a second end protrusion 333*b* of the plurality of ridge-like protrusions 333 disposed substantially in parallel to each other. This configuration prevents easy adhesion of mud to the second end of the mark.

While in the above examples, the ridge-like protrusions 18 extend substantially circumferentially, the ridge-like protrusions may extend in any directions. For example, the ridge-like protrusions may extend in a direction that is slanted at an angle of 30° or less relative to the radial direction, extend in a direction that is slanted at an angle of 15° or less relative to the radial direction, or extend radially. Further, while in the above examples, the mark 4 is fringed with the circular protrusions 15 and 16, the mark may be free of the fringe with the circular protrusions. Also, while in the above examples, the mark 4 is disposed on the bottom face of the depression 138 disposed on the base face Y, the mark need not be disposed on the depression on the base face Y. In some embodiments, the mark is not fringed with the circular protrusions and also is not disposed in the depression disposed on the base face Y.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A pneumatic tire comprising:
at least one mark on a sidewall of the pneumatic tire,
the at least one mark including an outer surface having a wavy curved face with two or more and four or fewer peaks,
the at least one mark including three or fewer valleys, each of the valleys being disposed between adjacent peaks of the two or more and four or fewer peaks, without sharp corners being present in the valleys,
the wavy curved face with two or more and four or fewer peaks reflecting light in different directions to produce variations of light and shadow, and
the two or more and four or fewer peaks and the three or fewer valleys being included in the mark.

2. The pneumatic tire according to claim 1, wherein the at least one mark comprises at least one protrusion protruding axially outward on an entire edge of the at least one mark, the at least one protrusion fringing the mark.

3. The pneumatic tire according to claim 2, wherein an absolute value of a difference between an axial position of a top located at an axially outermost site of the curved face and an axial position of an axially outermost site of the at least one circular protrusion is 5 mm or less.

4. The pneumatic tire according to claim 1, wherein the sidewall includes a base face and a depression disposed on the base face, and the at least one mark is disposed on a bottom face of the depression.

5. The pneumatic tire according to claim 4, wherein an absolute value of a difference between the axial position of an axially outermost site of the base face and the axial position of an axially outermost site of the curved face is 0.5 mm or less.

6. The pneumatic tire according to claim 1, wherein in the at least one mark, two adjacent peaks of the peaks are arranged at an interval in a direction that is slanted at 30° or less relative to a radial direction.

7. The pneumatic tire according to claim 1, wherein the at least one mark comprises an outer protrusion that fringes around an entire outer edge of the at least one mark, and an inner protrusion that fringes around an entire inner edge of the at least one mark.

8. The pneumatic tire according to claim 1, wherein the curved face has a smoothly connected shape, and the curved face includes an inflection line between a protrusion of the curved face and a recess of the curved face.

9. The pneumatic tire according to claim 1, wherein an axial distance between the axial position of an axially outermost site of the curved face and the axial position of an axially innermost site of the curved face is 0.4 mm or more and 3 mm or less.

10. The pneumatic tire according to claim 1, wherein the mark comprises a radially outermost edge and a radially innermost edge, the radially outermost edge and the radially innermost edge extending circumferentially in parallel to each other.

11. The pneumatic tire according to claim 1, wherein the curved face comprises a plurality of ridge-like protrusions disposed in parallel to each other, and the curved face further comprises a flat face disposed on a first side of a first end protrusion of the plurality of ridge-like protrusions located at a first end, and a further flat face disposed on a second side of a second end protrusion of the plurality of ridge-like protrusions located at a second end.

12. The pneumatic tire according to claim 1, wherein the outer surface of the at least one mark has a wavy curved face with two or more and three or fewer peaks, and the at least one mark includes two or fewer valleys, each of the valleys being disposed between adjacent peaks of the two or more and three or fewer peaks, without sharp corners being present in the valleys.

13. The pneumatic tire according to claim 1, wherein the two or more and four or fewer peaks and the three or fewer valleys producing variations of light and shadow have an approximately same height for the peaks, and an approximately same depth for the valleys.

* * * * *